US011052553B2

(12) United States Patent
Murakami et al.

(10) Patent No.: US 11,052,553 B2
(45) Date of Patent: Jul. 6, 2021

(54) OSCILLATORY LINEAR ACTUATOR AND HAIR CUTTING DEVICE

(71) Applicant: Panasonic Intellectual Property Management Co., Ltd., Osaka (JP)

(72) Inventors: Tomoaki Murakami, Osaka (JP); Noboru Kobayashi, Osaka (JP); Hiroki Inoue, Shiga (JP); Masashi Moriguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 15/952,535

(22) Filed: Apr. 13, 2018

(65) Prior Publication Data
US 2018/0304482 A1    Oct. 25, 2018

(30) Foreign Application Priority Data

Apr. 19, 2017   (JP) .............................. JP2017-082952

(51) Int. Cl.
*B26B 19/28*   (2006.01)
*H02K 33/16*   (2006.01)
(Continued)

(52) U.S. Cl.
CPC .............. *B26B 19/282* (2013.01); *H02K 7/04* (2013.01); *H02K 33/06* (2013.01); *H02K 33/16* (2013.01); *B26B 19/06* (2013.01); *B26B 19/288* (2013.01)

(58) Field of Classification Search
CPC ..... B26B 19/282; B26B 19/288; B26B 19/02; B26B 19/04; B26B 19/06; H02K 77/04; H02K 33/06; H02K 33/16
See application file for complete search history.

(56) References Cited

U.S. PATENT DOCUMENTS 5,632,087 A * 5/1997 Motohashi ............ B26B 19/282
30/43.9
5,685,077 A * 11/1997 Mukai ..................... B26B 19/04
30/43.91
(Continued)

FOREIGN PATENT DOCUMENTS

DE  102006034050 A1   1/2008
JP  2005-160134 A     6/2005
(Continued)

OTHER PUBLICATIONS

JP2005-160134 English Translation; Fujiwara et al. ; Jun. 16, 2005.*
(Continued)

*Primary Examiner* — Laura M Lee
(74) *Attorney, Agent, or Firm* — McDermott Will & Emery LLP (57) ABSTRACT

An oscillatory linear actuator includes an electromagnet that changes a magnetic field periodically, a first movable body, a second movable body, a holder, and a coupling spring. The first movable body is disposed on one side in the first direction of the electromagnet, includes a permanent magnet, and acts on a target object. The permanent magnet reciprocates in a second direction intersecting with the first direction by the electromagnet. The second movable body is juxtaposed to the first movable body and reciprocates in the second direction. The holder holds the first and second movable bodies to provide space between the first and second movable bodies and the electromagnet and to allow the first and second movable bodies to move in the second direction. The coupling spring is disposed on one side in the first direction of the holder and couples the first movable body and the second movable body.

15 Claims, 8 Drawing Sheets

(51) Int. Cl.
 *H02K 7/04* (2006.01)
 *H02K 33/06* (2006.01)
 *B26B 19/06* (2006.01)

(56) References Cited

U.S. PATENT DOCUMENTS

| | | | | |
|---|---|---|---|---|
| 5,921,134 | A | 7/1999 | Shiba et al. | |
| 6,559,563 | B1* | 5/2003 | Shimizu | H02K 33/10 |
| | | | | 30/43.92 |
| 7,053,507 | B2* | 5/2006 | Kobayashi | B26B 19/282 |
| | | | | 310/15 |
| 7,304,407 | B2* | 12/2007 | Sanematsu | H02K 33/16 |
| | | | | 310/12.24 |
| 7,965,000 | B2* | 6/2011 | Komori | H02K 33/16 |
| | | | | 310/15 |
| 8,258,657 | B2* | 9/2012 | Kim | H02K 15/02 |
| | | | | 310/28 |
| 8,373,315 | B2* | 2/2013 | Kobayashi | H02K 33/16 |
| | | | | 310/25 |
| 8,806,756 | B2* | 8/2014 | Kraus | B26B 19/288 |
| | | | | 30/43.3 |
| 9,527,219 | B2* | 12/2016 | Iwasaki | B26B 19/282 |
| 9,553,497 | B2* | 1/2017 | Kim | B06B 1/045 |
| 2003/0145469 | A1* | 8/2003 | Ogawa | B26B 19/02 |
| | | | | 30/210 |
| 2005/0134123 | A1 | 6/2005 | Kobayashi et al. | |
| 2009/0165305 | A1 | 7/2009 | Kraus et al. | |
| 2018/0304479 | A1* | 10/2018 | Murakami | H02K 33/06 |
| 2018/0304480 | A1* | 10/2018 | Murakami | B26B 19/288 |
| 2018/0304481 | A1* | 10/2018 | Murakami | H02K 33/06 |
| 2018/0304482 | A1* | 10/2018 | Murakami | B26B 19/282 |

FOREIGN PATENT DOCUMENTS

| | | |
|---|---|---|
| JP | 2005-185067 A | 7/2005 |
| JP | 2005-354879 A | 12/2005 |
| JP | 2010-075404 A | 4/2010 |

OTHER PUBLICATIONS

Extended European Search Report issued in Application No. 18166054.9 dated Aug. 21, 2018.

* cited by examiner

OSCILLATORY LINEAR ACTUATOR AND HAIR CUTTING DEVICE

CROSS REFERENCE TO RELATED APPLICATION

This application claims the benefit of priority of Japanese Patent Application Number 2017-082952 filed on Apr. 19, 2017, the entire content of which is hereby incorporated by reference.

BACKGROUND

1. Technical Field

The present disclosure relates to an oscillatory linear actuator and a hair cutting device.

2. Description of the Related Art

As a conventional example, Japanese Unexamined Patent Application Publication No. 2005-354879 discloses a structure of an oscillatory linear actuator in which an elastic support that supports and allows movers to reciprocate freely, and a coupling spring that couples a plurality of movers are aligned in the direction of reciprocating motion of the movers.

Japanese Unexamined Patent Application Publication No. 2005-185067 discloses a structure of an actuator in which an elastic support and a coupling spring are aligned in a direction perpendicular to a direction of reciprocating motion of two movers and the direction of alignment.

SUMMARY

The actuator disclosed in Japanese Unexamined Patent Application Publication No. 2005-354879, however, has a large dimension in the direction of reciprocating motion of the movers because the elastic support and the coupling spring are aligned in the direction of reciprocating motion.

In the actuator disclosed in Japanese Unexamined Patent Application Publication No. 2005-185067, the coupling spring and a stator for driving the movers are aligned in the direction of reciprocating motion of the movers. Thus, it is necessary to provide space between the coupling spring and the stator in order to prevent the coupling spring that moves in response to the reciprocating motion of the movers from interfering with the stator. The actuator disclosed in Japanese Unexamined Patent Application Publication No. 2005-185067 thus has a large dimension in the direction of reciprocating motion.

In view of this, the present disclosure provides an oscillatory linear actuator with a small dimension in the direction of reciprocating motion of movers.

In order to achieve the object described above, an oscillatory linear actuator according to an aspect of the present disclosure includes an electromagnet that changes a magnetic field periodically, a first movable body that is disposed on one side in a first direction of the electromagnet, includes a permanent magnet that makes a reciprocating motion in a second direction intersecting with the first direction under action of the magnetic field generated by the electromagnet, and acts on a target object, a second movable body that is juxtaposed to the first movable body and makes a reciprocating motion in the second direction, a holder that holds the first movable body and the second movable body to provide space between the first and second movable bodies and the electromagnet and to allow the first movable body and the second movable body to move in the second direction, and a coupling spring that is disposed on one side in the first direction of the holder and couples the first movable body and the second movable body.

A hair cutting device according to an aspect of the present disclosure includes the oscillatory linear actuator described above and a movable blade that is connected to the first movable body.

According to the present disclosure, it is possible to reduce the dimension of the oscillatory linear actuator in the direction of reciprocating motion of the movers.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

A hair cutting device and an oscillatory linear actuator according to embodiments of the present disclosure will be described in detail hereinafter with reference to the drawings. Each embodiment described below shows a specific example of the present disclosure. Thus, numerical values, shapes, materials, constituent elements, arrangement and connection forms of constituent elements, and so on given in the following embodiments are merely examples and are not intended to limit the present disclosure. Among the constituent elements in the following embodiments, those that are not recited in any one of the independent claims, which represent the broadest concept of the present disclosure, are described as optional constituent elements.

Note that the drawings are schematic diagrams and do not always strictly follow the actual configuration. In the drawings, constituent members that are substantially identical are given the same reference signs.

Hair Cutting Device

A hair cutting device according to an embodiment of the present disclosure will be described.

Figure 1:
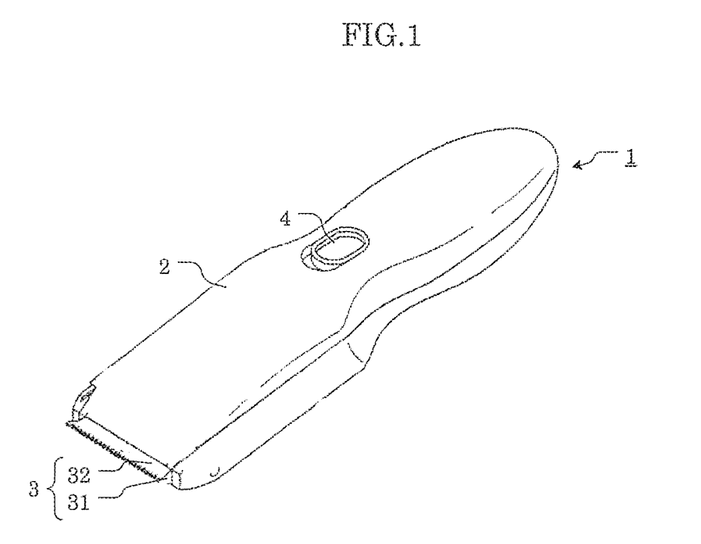
FIG. 1 is a perspective view illustrating a schematic configuration of a hair cutting device according to an embodiment.

FIG. 1 is a perspective view illustrating a schematic configuration of hair cutting device 1 according to an embodiment of the present disclosure.

Hair cutting device 1 is, for example, an electric hair clipper that includes case 2, blade unit 3, and switch 4. Oscillatory linear actuator 100 for driving blade unit 3 (see, for example, FIG. 2) is housed in case 2.

Blade unit 3 is mounted on a tip portion of case 2. Blade unit 3 has a function of cutting hair such as human hair. Specifically, blade unit 3 includes stationary blade 31 and movable blade 32. Stationary blade 31 is fixed to the tip portion of case 2. Movable blade 32 is connected to shaft portion 520 (see, for example, FIG. 2) of first movable body 101 of oscillatory linear actuator 100 and is included in part of first movable body 101, which will be described later. Stationary blade 31 and movable blade 32 are in contact with each other at their facing surfaces. Movable blade 32 is reciprocated relative to stationary blade 31 by oscillatory linear actuator 100. This reciprocating motion allows blade unit 3 to cut hair.

Oscillatory Linear Actuator

Next, oscillatory linear actuator 100 will be described in detail.

Figure 2:
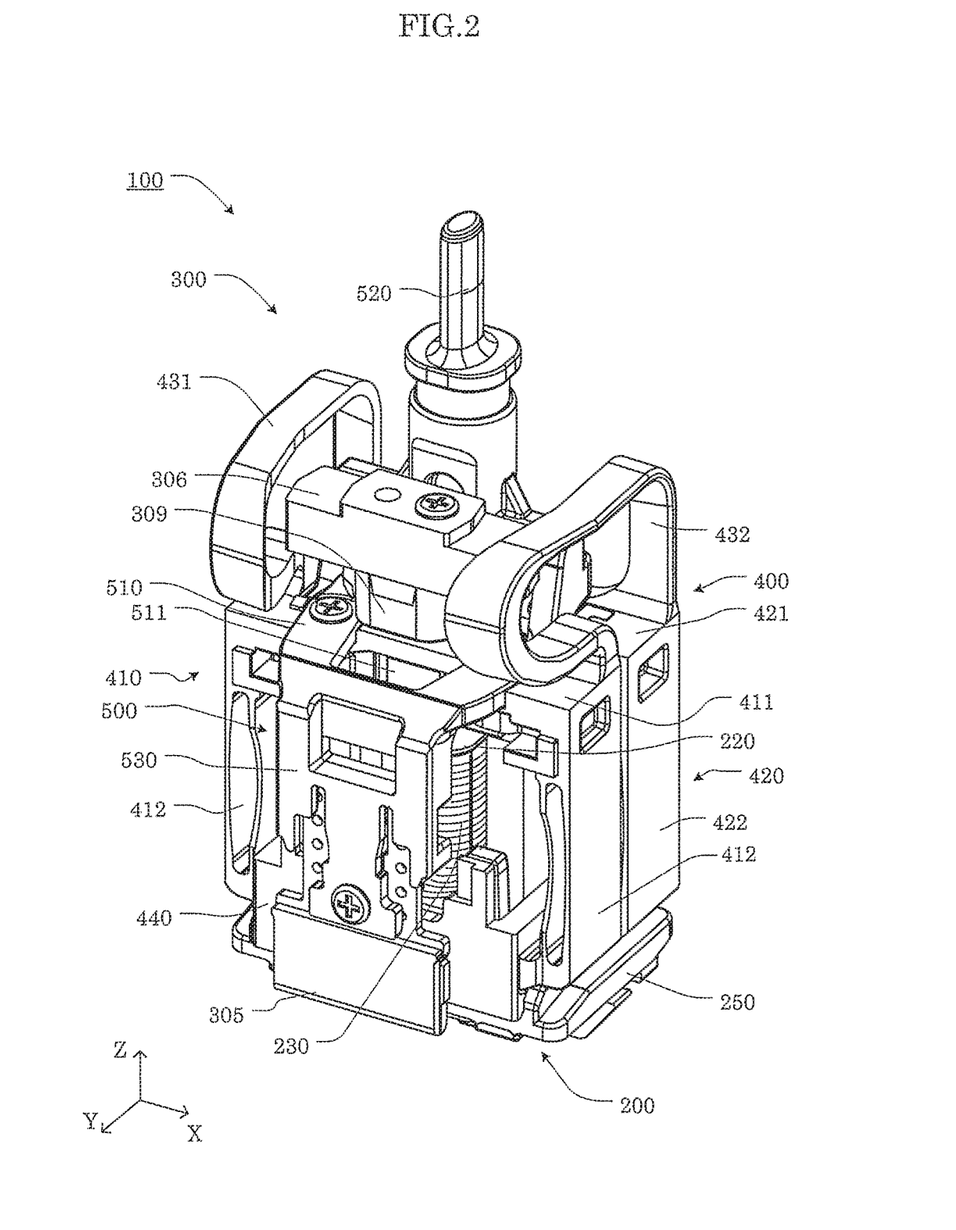
FIG. 2 is a perspective view illustrating a schematic configuration of an oscillatory linear actuator according to the embodiment.

FIG. 2 is a perspective view illustrating a schematic configuration of the oscillatory linear actuator according to an embodiment of the present disclosure.

Figure 3:
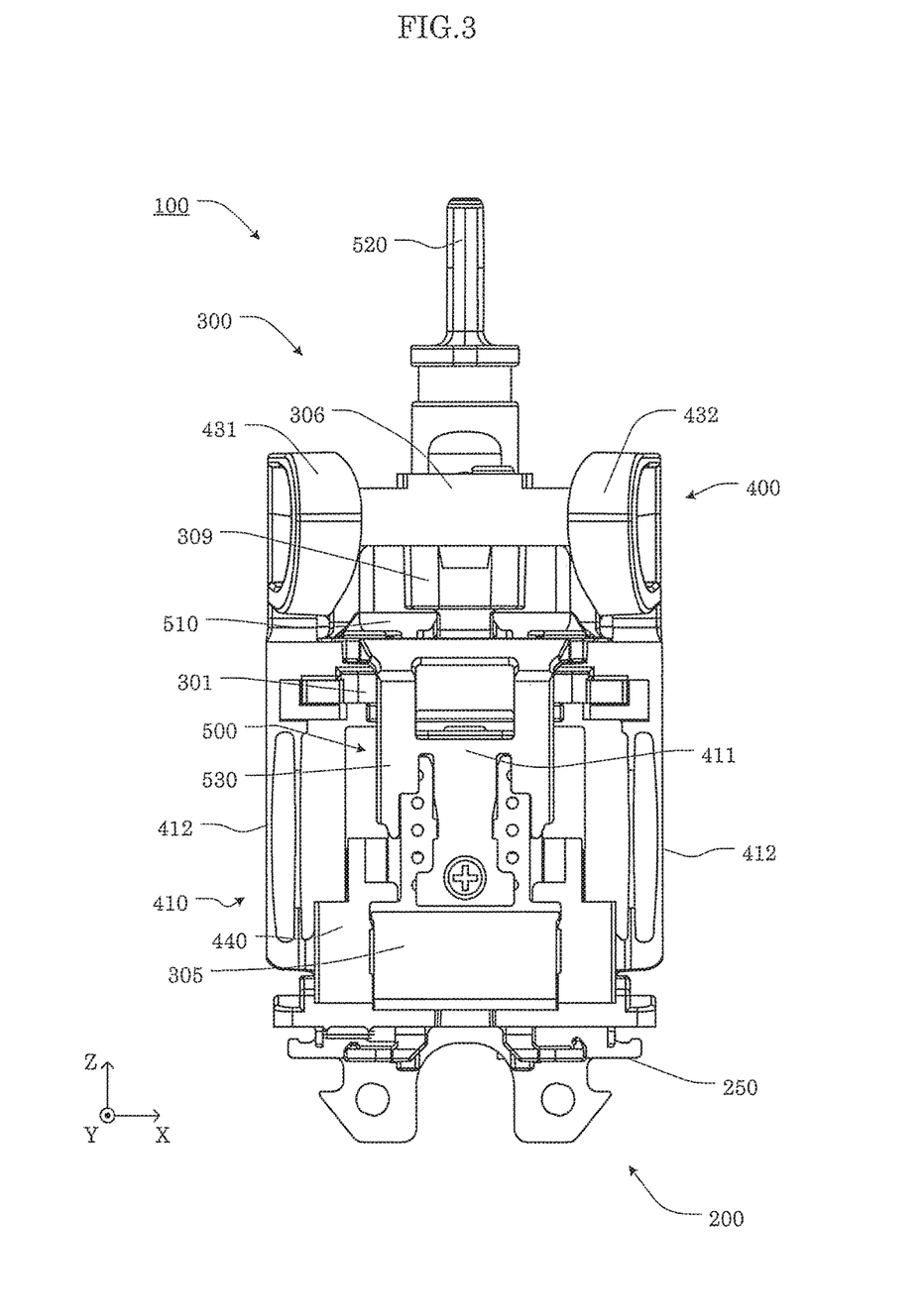
FIG. 3 is a front view illustrating a schematic configuration of the oscillatory linear actuator according to the embodiment.

FIG. 3 is a front view illustrating a schematic configuration of the oscillatory linear actuator according to the embodiment.

Figure 4:
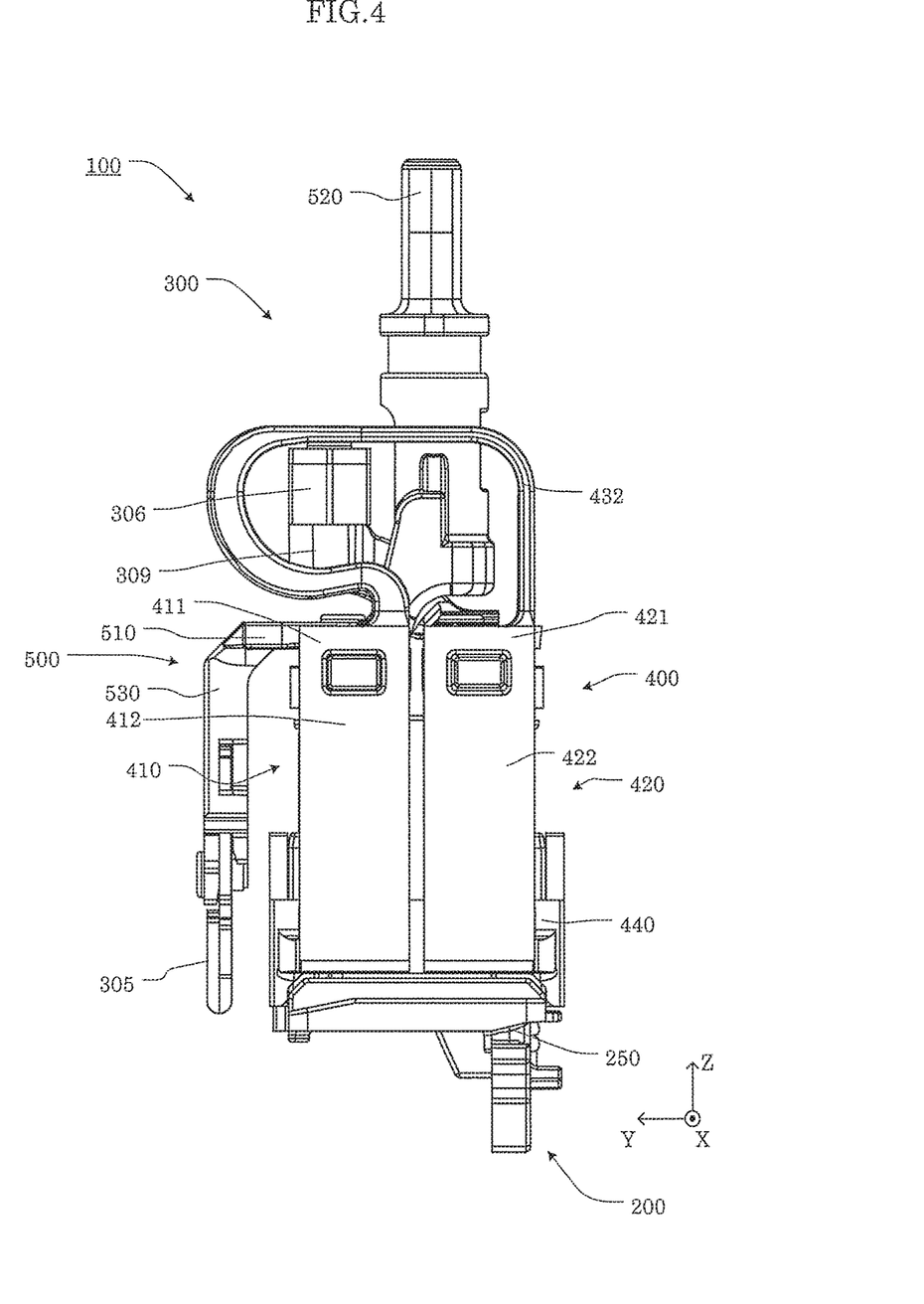
FIG. 4 is a side view illustrating a schematic configuration of the oscillatory linear actuator according to the embodiment.

FIG. 4 is a side view illustrating a schematic configuration of the oscillatory linear actuator according to the embodiment.

Figure 5:
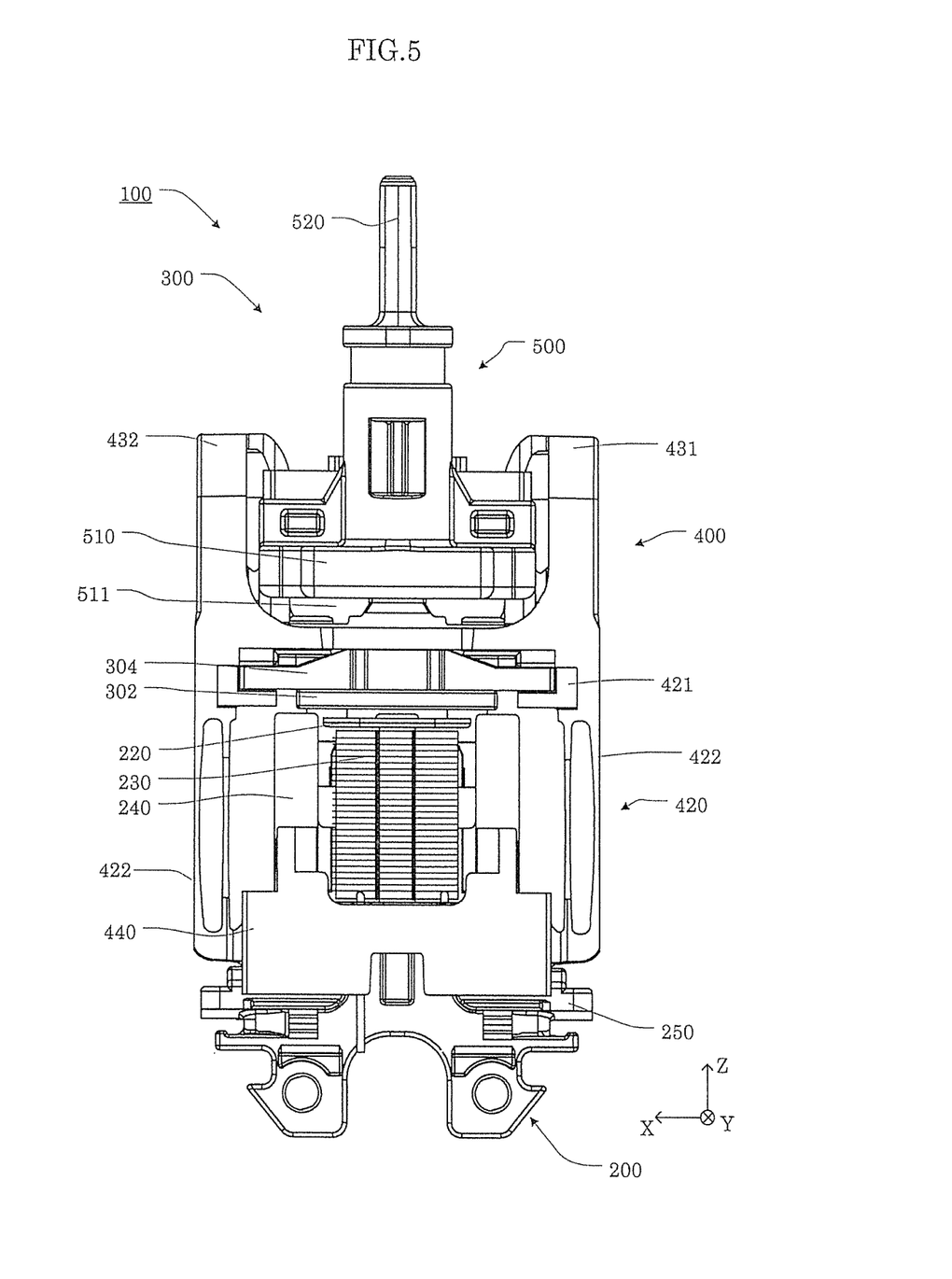
FIG. 5 is a rear view illustrating a schematic configuration of the oscillatory linear actuator according to the embodiment.

FIG. 5 is a rear view illustrating a schematic configuration of the oscillatory linear actuator according to the embodiment.

Figure 6:
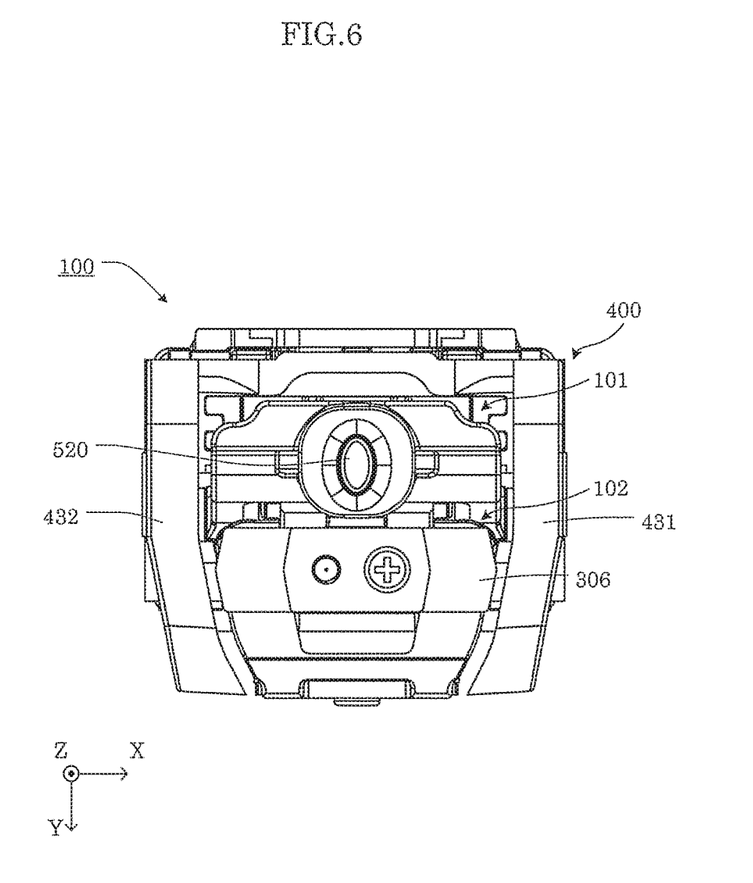
FIG. 6 is a top view illustrating a schematic configuration of the oscillatory linear actuator according to the embodiment.

FIG. 6 is a top view illustrating a schematic configuration of the oscillatory linear actuator according to the embodiment.

Figure 7:
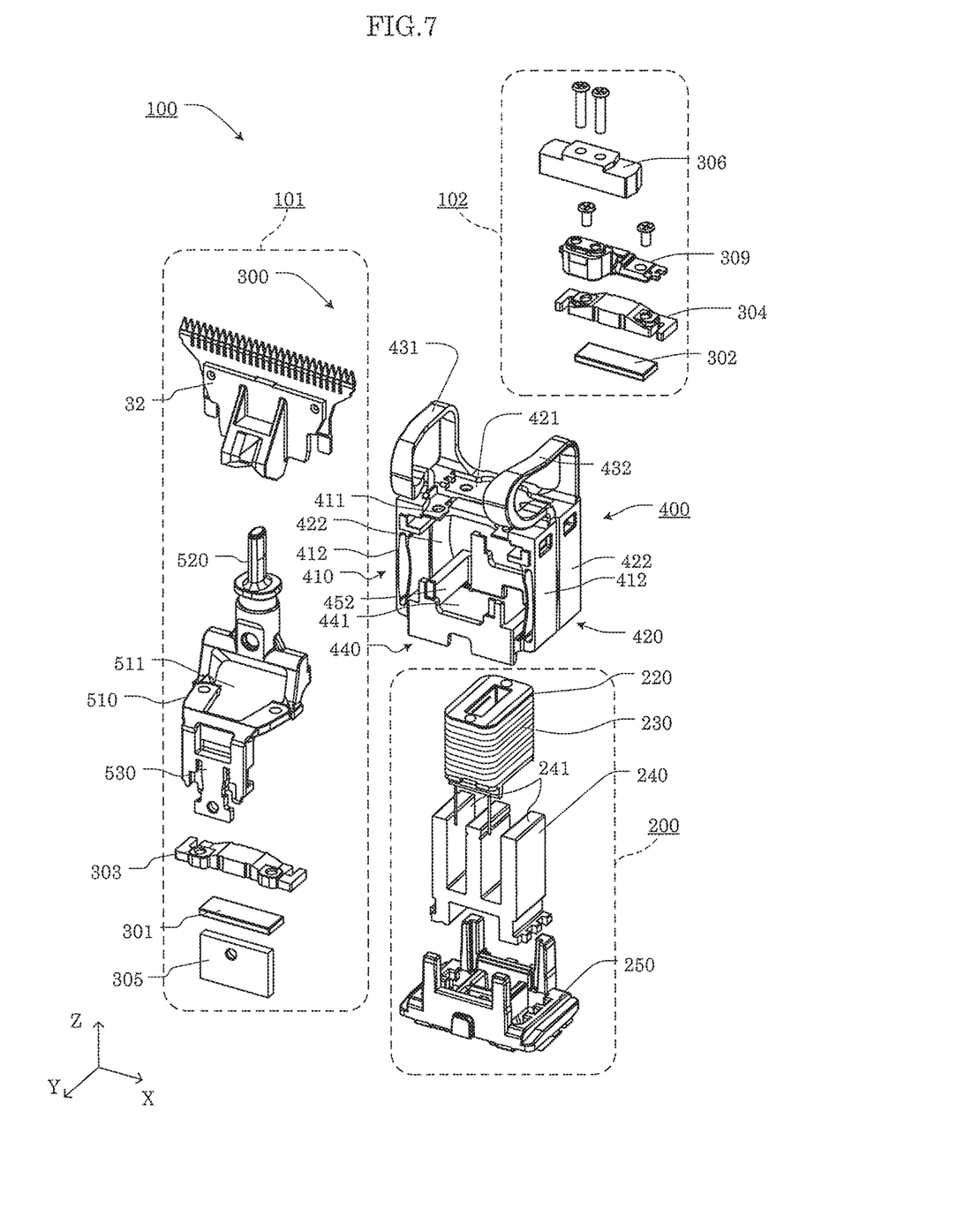
FIG. 7 is an exploded perspective view illustrating a schematic configuration of the oscillatory linear actuator according to the embodiment.

FIG. 7 is an exploded perspective view illustrating a schematic configuration of the oscillatory linear actuator according to the embodiment.

Figure 8:
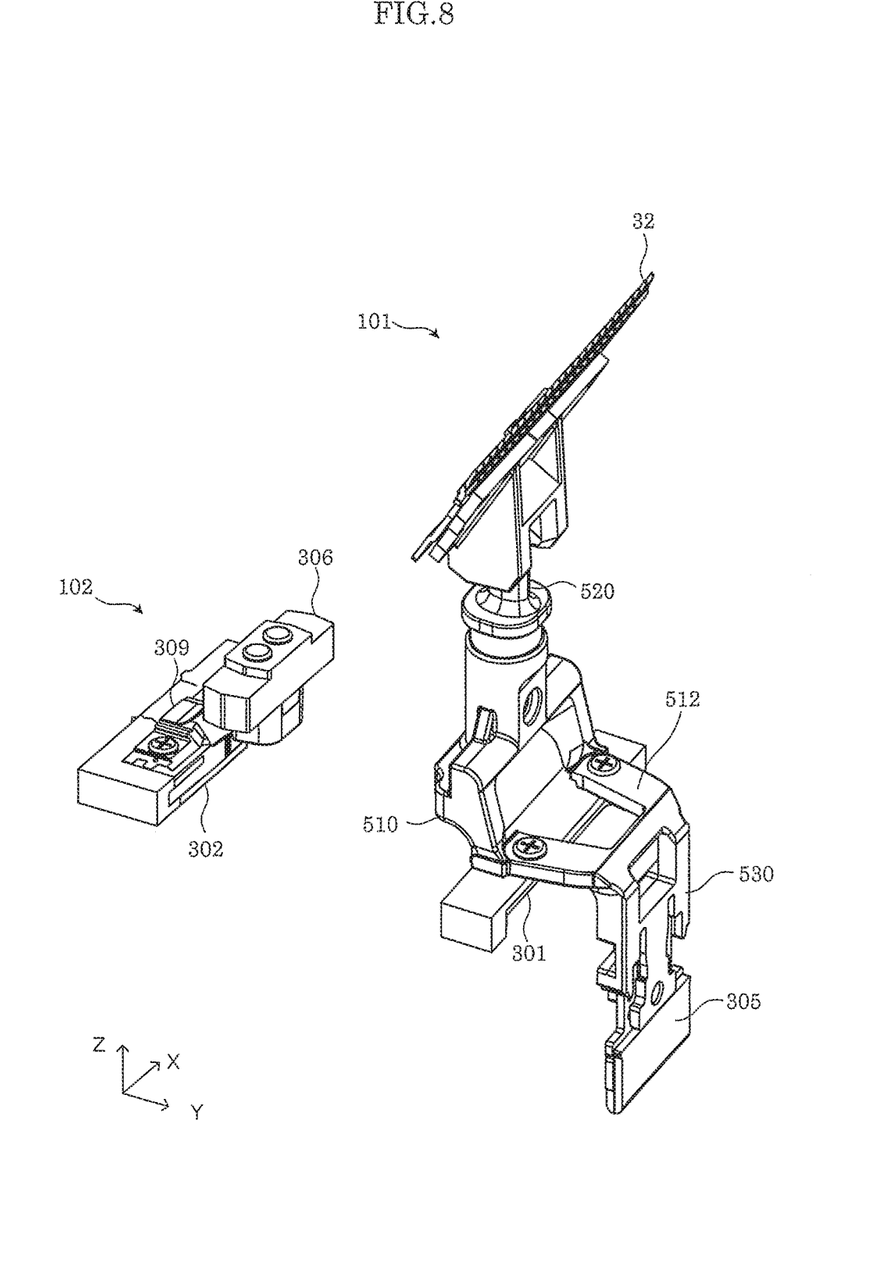
FIG. 8 is a perspective view illustrating schematic configurations of a first movable body and a second movable body according to an embodiment.

FIG. 8 is a perspective view illustrating schematic configurations of a first movable body and a second movable body according to the embodiment.

FIGS. 2 to 8 illustrate each component in a three-dimensional orthogonal coordinate system in which the direction of oscillation of first movable body 101 and second movable body 102 is taken as the X axial direction, the direction of alignment of first movable body 101 and second movable body 102 is taken as the Y axial direction, and the axial direction of shaft portion 520 of first movable body 101 is taken as the Z axial direction. Depending on the condition of use, there can be cases in which the Z axial direction is not the up-down direction, but for the sake of convenience of description, the Z axial direction is described as the up-down direction in the following description.

As illustrated in these drawings (in particular, FIGS. 7 and 8), oscillatory linear actuator 100 includes first movable body 101, second movable body 102, electromagnetic core block 200, and frame 400.

First Movable Unit

First movable body 101 is a member that is disposed on the plus side in the Z axial direction of electromagnetic core block 200, is reciprocated by the action of a magnetic field that is generated by electromagnetic core block 200 and that changes periodically, and acts on a target object such as hair. In the case of the present embodiment, first movable body 101 includes movable blade 32, body portion 510, first magnet 301, first yoke 303, and first weight 305.

Body portion 510 is a portion that is a structural member forming the framework of first movable body 101 and that is mounted on frame 400. Body portion 510 is bent in a crank-like shape when viewed as a whole, and includes mounting portion 512, shaft portion 520, and weight support 530, the mounting portion being disposed in an XY plane, the shaft portion being disposed at one end along the Y axis of mounting portion 512 and extending upward in the Z axial direction, and the weight support being suspended from the other end of mounting portion 512 and holding first weight 305.

The tip portion of shaft portion 520 has an approximately circular columnar (oval) shape and has movable blade 32 mounted thereto.

Weight support 530 is a portion that holds first weight 305 at a position spaced from mounting portion 512 in order to strike a balance between mounting portion 512 and movable blade 32.

First magnet 301 is a permanent magnet mounted on the underside of mounting portion 512. First magnet 301 is a member that has one end in the X axial direction as the north pole and the other end as the south pole, is reciprocated in the X axial direction by the action of a magnetic field that is generated by electromagnetic core block 200 and that changes periodically, and produces thrust for causing movable blade 32 to reciprocate.

First yoke 303 is a member made of a magnetic material that concentrates the magnetic flux of first magnet 301 and increases the action of the magnetic field generated by electromagnetic core block 200.

First weight 305 is a member that is mounted on a position on the side of first magnet 301 opposite to movable blade 32 and adjusts the center of gravity of first movable body 101.

Second Movable Unit

Second movable body 102 is a member that is juxtaposed to first movable body 101 and reciprocates in the X axial direction. Second movable body 102 is a member that reciprocates with a phase opposite to that of first movable body 101 and suppresses the oscillation of entire oscillatory linear actuator 100. In the case of present embodiment, second movable body 102 includes connector 309, second magnet 302, second yoke 304, and second weight 306.

Connector 309 is a member that is a structural member forming the framework of second movable body 102 and that is mounted on frame 400.

Second magnet 302 is a permanent magnet that is mounted on the underside of connector 309. Second magnet 302 has one end in the X axial direction as the south pole and the other end as the north pole, and first and second magnets 301 and 302 are disposed so as to be opposite in polarity. For example, first and second magnets 301 and 302 are disposed such that when the negative end portion in the X axial direction of first magnet 301 is the north pole and the positive end portion thereof is the south pole, the negative end portion of second magnet 302 is the south pole and the positive end portion thereof is the north pole. Like first magnet 301, second magnet 302 is a member that is reciprocated along the X axis with the phase opposite to that of first magnet 301 by the action of the magnetic field that is generated by electromagnetic core block 200 and that changes periodically.

Second yoke 304 is a member made of a magnetic material that concentrates the magnetic flux of second magnet 302 and increases the action of the magnetic field generated by electromagnetic core block 200.

Second weight 306 is a member that adjusts a weight balance with first movable body 101.

Electromagnetic Core Block

Electromagnetic core block 200 is equipment that generates driving force for causing first movable body 101 to reciprocate in the direction of oscillation (X axial direction in the drawing) and includes coil bobbin 220, coil 230, core 240, and base 250. Electromagnetic core block 200 is an electromagnet that changes a magnetic field periodically. In the case of the present embodiment, electromagnetic core block 200 also causes second movable body 102 to reciprocate.

Coil 230 is a member that is made of a spirally wound conductive wire rod and capable of generating a magnetic field by passing a current through the wire rod. Coil 230 is capable of periodically and repeatedly inverting the polarity of the magnetic field to be generated, by passing an alternating current through coil 230 and capable of causing first and second movable bodies 101 and 102 to reciprocate.

Coil bobbin 220 is a member that serves as a substrate forming a coil by winding a conductive wire rod therearound. In the case of the present embodiment, coil bobbin 220 is made of an insulator in an angular tubular shape.

Core 240 is a member that is made of a magnetic material and guides the magnetic field generated within coil 230 to a predetermined position. In the case of the present embodiment, core 240 is a member that has an E-shape in a side view and that integrally includes columnar portion 241 that penetrate through coil bobbin 220, two columnar portions 241 that are juxtaposed on both sides of coil bobbin 220, and a base portion that connects these columnar portions at the lower end. The shape of core 240 is not limited to the E-shape and may be any other arbitrary shape such as a U-shape.

Base 250 is a member that is made of, for example, an insulator and supports core 240 and also supports coil bobbin 220 via core 240. Base 250 is a member that holds core 240, coil bobbin 220, and coil 230 at predetermined positions relative to frame 400.

Frame

Frame 400 holds first and second movable bodies 101 and 102 so as to allow the movable bodies to reciprocate. Frame 400 is a member that provides space between first and second movable bodies 101 and 102 and electromagnetic core block 200. In the case of the present embodiment, frame 400 is integrally molded of, for example, a resin and includes first holder 410 that holds first movable body 101, second holder 420 that holds second movable body 102, a pair of coupling springs 431 and 432 that couple first and second holders 410 and 420, and third holder 440 that holds electromagnetic core block 200.

First holder 410 includes first stationary portion 411 that is long in the X axial direction, and a pair of first spring portions 412 that are suspended from both end portions of first stationary portion 411 and coupled to third holder 440. That is, first holder 410 holds first movable body 101 so as to provide space between first movable body 101 and electromagnetic core block 200 and to allow first movable body 101 to move in the X axial direction.

First stationary portion 411 fixes first movable body 101. In the case of the present embodiment, first magnet 301 and first yoke 303 are mounted in the specified order from below on first stationary portion 411, and mounting portion 512 is mounted from above on first stationary portion 411. These members are fastened with fasteners (e.g., screws).

The pair of first spring portions 412 is a member that, when a force in a direction along the X axial direction is applied to first stationary portion 411, applies a force in the opposite direction to the direction of the above force. That is, when first movable body 101 moves to the positive side in the X axial direction and accordingly a force in the positive X axial direction is applied to first stationary portion 411, the pair of first spring portions 412 applies a force in the negative X axial direction to first stationary portion 411.

Second holder 420 includes long plate-like second stationary portion 421 that is juxtaposed to first stationary portion 411 and extends in the X axial direction, and a pair of second spring portions 422 that are suspended from both end portions of second stationary portion 421 and coupled to third holder 440. That is, second holder 420 holds second movable body 102 so as to provide space between second movable body 102 and electromagnetic core block 200 and to allow second movable body 102 to move in the X axial direction. Second holder 420 is adjacent to first holder 410 in the Y axial direction.

Second stationary portion 421 fixes second movable body 102. In the case of the present embodiment, second magnet 302 and second yoke 304 are mounted in the specified order from below on second stationary portion 421, and connector 309 and second weight 306 are mounted in the specified order from above on second stationary portion 421.

The pair of second spring portions 422 is a portion that, when a force in a direction along the X axial direction is applied to second stationary portion 421, applies a force in the opposite direction to the direction of the above force. That is, for example when second movable body 102 moves in the positive X axial direction and accordingly a force in the positive X axial direction is applied to second stationary portion 421, the pair of second spring portions 422 applies a force in the negative X axial direction to second stationary portion 421.

The pair of coupling springs 431 and 432 is a pair of flat and curved plate springs and couples first and second holders 410 and 420 so as to allow first and second holders 410 and 420 to oscillate freely. Specifically, one coupling spring 431 out of the pair of coupling springs 431 and 432 couples one end of first stationary portion 411 of first holder 410 and one end of second stationary portion 421 of second holder 420. The other coupling spring 432 couples the other end of first stationary portion 411 of first holder 410 and the other end of second stationary portion 421 of second holder 420. As a result, the pair of coupling springs 431 and 432 couples first and second movable bodies 101 and 102.

As illustrated in FIG. 6, coupling spring 431 that couples the minus side ends in the X axial direction of first and second stationary portions 411 and 421 has a shape that approaches the plus side in the X axial direction as it approaches the plus side in the Y axial direction when viewed in the Z axial direction. Coupling spring 432 that couples the plus side ends in the X axial direction of first and second stationary portions 411 and 421 has a shape that approaches the minus side in the X axial direction as it approaches the plus side in the Y axial direction when viewed in the Z axial direction. That is, when viewed in the Z axial direction, two coupling springs 431 and 432 have shapes that approach each other in the X axial direction as they approach the plus side in the Y axial direction.

Coupling springs 431 and 432 are disposed at positions that do not interfere with the reciprocating motion of first and second movable bodies 101 and 102. That is, coupling springs 431 and 432 are disposed in a space that excludes spaces where first movable body 101 passes through during reciprocating motion and where second movable body 102 passes through during reciprocating motion. Specifically, when viewed in the X axial direction, two coupling springs 431 and 432 are configured in a ring shape so as to surround the both ends in the X axial direction of first and second movable bodies 101 and 102. When viewed in the X axial direction, the pair of coupling springs 431 and 432 may have a ring shape that protrudes on the plus side in the Y axial direction. That is, the pair of coupling springs 431 and 432 may have a structure that allows second movable body 102 to have a greater amplitude in the X axial direction than first movable body 101, i.e., that allows second stationary portion 421 to have a greater amplitude than first stationary portion 411.

The positions in the X axial direction of coupling springs 431 and 432 overlap with the positions in the X direction that are within the range of the reciprocating motion of first or second movable body 101 or 102.

Third holder 440 is a frame body with a rectangular opening 441 when viewed from above. Third holder 440 holds electromagnetic core block 200 with electromagnetic core block 200 inserted into opening 441.

Third holder 440 is coupled to first spring portions 412 of first holder 410 and second spring portions 422 of second holder 420. Thus, first spring portions 412 and second spring portions 422 oscillate with the points of coupling with third holder 440 as starting points.

Operations

Next, operations of oscillatory linear actuator 100 will be described.

When an alternating current is supplied to coil 230 of electromagnetic core block 200 forming an electromagnet, a state of north, south, and north poles in sequence and a state of south, north, and south poles in sequence interchange periodically at top end surfaces of columnar portions 241 of core 240.

Meanwhile, first magnet 301 held by first holder 410 and second magnet 302 held by second holder 420 are disposed so as to be opposite in polarity. Thus, opposite forces along the X axis are generated in first and second magnets 301 and 302 by the magnetic force generated by one coil 230, and first and second magnets 301 and 302 move linearly in opposite directions. As a result, first and second movable bodies 101 and 102 oscillate with opposite phases.

Advantageous Effects

As described above, oscillatory linear actuator 100 provided in hair cutting device 1 according to the present embodiment includes electromagnetic core block 200, first movable body 101, second movable body 102, first holder 410, second holder 420, and coupling springs 431 and 432. Electromagnetic core block 200 changes a magnetic field periodically. First movable body 101 is disposed on one side in a first direction of electromagnetic core block 200. First movable body 101 includes first magnet 301 that is reciprocated in a second direction that intersects with the first direction by the action of the magnetic field generated by electromagnetic core block 200. The first movable body acts on a target object. Second movable body 102 is juxtaposed to first movable body 101 and reciprocates in the second direction. First and second holders 410 and 420 hold first and second movable bodies 101 and 102 so as to provide space between electromagnetic core block 200 and first and second movable bodies 101 and 102 and to allow first and second movable bodies 101 and 102 to move in the second direction. Coupling springs 431 and 432 are disposed on sides in the first direction of first and second holders 410 and 420 and couple first and second movable bodies 101 and 102.

With this configuration, since the pair of coupling springs 431 and 432 is disposed on the plus side in the Z axial direction of frame 400, the dimension in the X axial direction of oscillatory linear actuator 100 can be reduced.

In the present embodiment, coupling springs 431 and 432 are disposed at positions that do not interfere with the reciprocating motion of first and second movable bodies 101 and 102.

Thus, the dimension in the X axial direction of oscillatory linear actuator 100 can be reduced without affecting the movable widths in the X axial direction of first and second movable bodies 101 and 102.

In the present embodiment, second movable body 102 includes second weight 306 for weight adjustment.

Thus, the dimension in the X axial direction of oscillatory linear actuator 100 can be reduced without affecting the movable width in the X axial direction of second movable body 102 that includes second weight 306.

In the present embodiment, when viewed in the second direction, coupling springs 431 and 432 have a ring shape that surrounds part (in the present embodiment, both ends) of first and second movable bodies 101 and 102.

Thus, the pair of coupling springs 431 and 432 reciprocates inside the ring-shaped portions of first and second movable bodies 101 and 102. This makes it possible to reduce the dimension in the X axial direction of oscillatory linear actuator 100 without affecting the movable widths in the X axial direction.

In the present embodiment, the positions in the second direction of coupling springs 431 and 432 overlap with the positions in the second direction that are within the range of the reciprocating motion of first or second movable body 101 or 102.

Thus, the dimension in the X axial direction of oscillatory linear actuator 100 can be reduced effectively.

In the present embodiment, coupling springs 431 and 432 couple one end in the second direction of first movable body 101 and one end of second movable body 102. When viewed in the first direction, coupling springs 431 and 432 have a shape that approaches the other end in the second direction as they approach in a third direction orthogonal to the second direction.

Thus, it is possible to reduce the volume of the space occupied by the coupling springs and to reduce the dimensions of the oscillatory linear actuator.

Variations

The present disclosure is not limited to the embodiments described above. For example, the present disclosure also includes other embodiments implemented by any combination of constituent elements described in the specification of the present disclosure or by excluding some constituent elements. The present disclosure also includes variations implemented by making various modifications conceivable by those skilled in the art to the embodiments without departing from the languages recited in the scope of the present disclosure.

For example, the shape and configuration of components of first movable body 101 are not limited to those in the above-described embodiments. For example, electromagnetic core block 200 may include a permanent magnet, and first movable body 101 may include an electromagnet.

Similarly to first movable body 101, the shape and configuration of components of second movable body 102 are not limited to those in the above-described embodiments, and second movable body 102 may include an electromagnet.

First movable body 101 may include a plurality of active objects such as movable blade 32. Even if first movable body 101 is separated into a plurality of parts, those parts oscillate integrally with the same phase, and first movable body 101 produces thrust acting on target objects. Second movable body 102 may be separated into a plurality of parts as long as those parts oscillate with the phase opposite to the phase of first movable body 101.

Second movable body 102 may be configured to include a movable blade different from movable blade 32.

While second movable body 102 is described as oscillating under the action of electromagnetic core block 200, second movable body 102 may function as a dynamic vibration absorber that does not act with the magnetic force generated by electromagnetic core block 200 and that is connected to first movable body 101 via an elastic member. In this case, second movable body 102 does not necessarily have to include a permanent magnet and an electromagnet.

While first holder 410 is configured to include first stationary portion 411 and first spring portions 412, the present disclosure is not limited to this example. For example, the first holder may be a direct-acting guide that holds first movable body 101 so as to provide space between first movable body 101 and electromagnetic core block 200 and to allow first movable body 101 to move in the X axial direction. The same applies to second holder 420.

While coupling springs 431 and 432 couple first and second stationary portions 411 and 421 so as to couple first and second movable bodies 101 and 102, coupling springs 431 and 432 may be configured to be coupled to first and second movable bodies 101 and 102.

While the pair of coupling springs 431 and 432 is used to couple first and second movable bodies 101 and 102, only either of the coupling springs may be used to couple first and second movable bodies 101 and 102.

While coupling spring 431 as viewed in the Z axial direction has a shape that approaches the plus side in the X axial direction as it approaches the plus side in the Y axial direction, coupling spring 431 may have a shape that approaches the plus side in the X axial direction as it approaches the minus side in the Y axial direction. Similarly, coupling spring 432 as viewed in the Z axial direction may have a shape that approaches the minus side in the X axial direction as it approaches the minus side in the Y axial direction.

While coupling springs 431 and 432 are configured to have a ring shape that surrounds the both ends in the X axial direction of first and second movable bodies 101 and 102 when viewed in the X axial direction, the coupling springs do not necessarily have to surround the both ends in the X axial direction of first and second movable bodies 101 and 102. That is, when viewed in the X axial direction, the coupling springs may surround positions on the inner side in the X axial direction of the both ends in the X axial direction of first and second movable bodies 101 and 102.

Other Embodiments

While the hair cutting device and the oscillatory linear actuator according to the present disclosure have been described thus far by way of embodiments, the present disclosure is not intended to be limited to the embodiments described above. In the following description, constituent elements that are identical to those in the above-described embodiments may be given the same reference numerals, and a description thereof may be omitted.

For example, while the above-described embodiments describe an electric hair clipper as an example of the hair cutting device, the hair cutting device may be any equipment that removes hair. Examples other than electric hair clippers include electric shavers.

The present disclosure also includes other embodiments obtained by making various modifications conceivable by a person skilled in the art to each embodiment, and embodiments implemented by any combination of the constituent elements and functions of each embodiment without departing from the scope of the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a hair cutting device that removes hair with equipment such as an electric hair clipper or an electric razor.

What is claimed is:

1. An oscillatory linear actuator comprising:
an electromagnet that changes a magnetic field periodically;
a first movable body that is disposed on one side in a first direction of the electromagnet, and includes a permanent magnet that makes a reciprocating motion in a second direction intersecting with the first direction under action of the magnetic field generated by the electromagnet;
a second movable body that is juxtaposed to the first movable body and makes a reciprocating motion in the second direction;
a holder that holds the first movable body and the second movable body to provide space between the first and second movable bodies and the electromagnet and to allow the first movable body and the second movable body to move in the second direction; and
a coupling spring that is disposed on one side of the first movable body and the second movable body with respect to the first direction and mutually couples the first movable body and the second movable body,
wherein when viewed in the second direction, the coupling spring has a ring shape that surrounds an end of first movable body and an end of the second movable body.

2. The oscillatory linear actuator according to claim 1, wherein the coupling spring is disposed in a space that excludes a space in which first movable body passes through during reciprocating motion and a space in which second movable body passes through during reciprocating motion.

3. The oscillatory linear actuator according to claim 1, wherein the second movable body includes a weight.

4. The oscillatory linear actuator according to claim 1, wherein a position of the coupling spring in the second direction overlaps with a position in the second direction that is within a range of the reciprocating motion of the first movable body or the second movable body.

5. The oscillatory linear actuator according to claim 1,
wherein the coupling spring is coupled to a part of the first movable body and to a part of the second movable body, and
when viewed in the first direction, the coupling spring is bent toward a center of the second movable body.

6. The oscillatory linear actuator according to claim 1,
wherein the holder includes:
a first stationary portion that is connected to the first movable body;
a second stationary portion that is juxtaposed to the first stationary portion and is connected to the second movable body;
a first spring portion that, when a first force in a direction along the second direction is applied to the first stationary portion, applies a second force in an opposite direction to the direction of the first force to the first stationary portion;
a second spring portion that, when a third force in a direction along the second direction is applied to the second stationary portion, applies a fourth force in an opposite direction to the direction of the third force to the second stationary portion, and
the coupling spring couples the first movable body and the second movable body by coupling the first stationary portion and the second stationary portion.

7. The oscillatory linear actuator according to claim 1,
wherein the holder and the coupling spring are integrally molded.

8. A hair cutting device comprising:
the oscillatory linear actuator according to claim 1; and
a movable blade that is connected to the first movable body.

9. An oscillatory linear actuator comprising:
an electromagnet that changes a magnetic field periodically;
a first movable body that is disposed on one side in a first direction of the electromagnet, and includes a permanent magnet that makes a reciprocating motion in a second direction intersecting with the first direction under action of the magnetic field generated by the electromagnet;
a second movable body that is juxtaposed to the first movable body and makes a reciprocating motion in the second direction;
a holder that holds the first movable body and the second movable body to provide space between the first and second movable bodies and the electromagnet and to allow the first movable body and the second movable body to move in the second direction; and
a coupling spring that is disposed on one side of the first movable body and the second movable body with respect to the first direction and mutually couples the first movable body and the second movable body,
wherein the holder includes:
a first stationary portion that is connected to the first movable body;
a second stationary portion that is juxtaposed to the first stationary portion and is connected to the second movable body;
a first spring portion that, when a first force in a direction along the second direction is applied to the first stationary portion, applies a second force in an opposite direction to the direction of the first force to the first stationary portion;
a second spring portion that, when a third force in a direction along the second direction is applied to the second stationary portion, applies a fourth force in an opposite direction to the direction of the third force to the second stationary portion, and
the coupling spring couples the first movable body and the second movable body by coupling the first stationary portion and the second stationary portion.

10. The oscillatory linear actuator according to claim 9,
wherein the coupling spring is disposed in a space that excludes a space in which first movable body passes through during reciprocating motion and a space in which second movable body passes through during reciprocating motion.

11. The oscillatory linear actuator according to claim 9,
wherein the second movable body includes a weight.

12. The oscillatory linear actuator according to claim 9,
wherein a position of the coupling spring in the second direction overlaps with a position in the second direction that is within a range of the reciprocating motion of the first movable body or the second movable body.

13. The oscillatory linear actuator according to claim 9,
wherein the coupling spring is coupled to a part of the first movable body and to a part of the second movable body, and
when viewed in the first direction, the coupling spring is bent toward a center of the second movable body.

14. The oscillatory linear actuator according to claim 9,
wherein the holder and the coupling spring are integrally molded.

15. A hair cutting device comprising:
the oscillatory linear actuator according to claim 9; and
a movable blade that is connected to the first movable body.

* * * * *